United States Patent [19]

Tamura

[11] 4,415,925
[45] Nov. 15, 1983

[54] COLOR ORIGINAL READOUT APPARATUS

[75] Inventor: Yasuyuki Tamura, Kawasaki, Japan

[73] Assignee: Canon Kabushiki Kaisha, Tokyo, Japan

[21] Appl. No.: 342,766

[22] Filed: Jan. 26, 1982

[30] Foreign Application Priority Data

Feb. 5, 1981 [JP] Japan .................................. 56-16215
Feb. 6, 1981 [JP] Japan .................................. 56-16408

[51] Int. Cl.³ ............................................. H04N 1/46
[52] U.S. Cl. .................................................... 358/75
[58] Field of Search .................................... 358/75, 79

[56] References Cited

U.S. PATENT DOCUMENTS 3,135,828  6/1964  Simjian ................................. 358/75
3,555,262  1/1971  Shimada ................................ 358/79
4,264,921  4/1981  Pennington et al. ................. 358/75
4,367,946  1/1983  Varner .................................. 358/75

*Primary Examiner*—Richard Murray
*Attorney, Agent, or Firm*—Fitzpatrick, Cella, Harper & Scinto

[57] ABSTRACT

The invention provides a color original readout apparatus having a light source with filters of different colors for emitting light of a plurality of different colors, and a CCD image sensor for reading the image of an original by light reflected from an original, a prism for varying the optical path of the reflected light into the image sensor in accordance with the spectrum of light. The apparatus of the invention is of simple construction and allows readout of the color original without color drift. The color data required for color separation can be obtained from the same scanning line.

11 Claims, 10 Drawing Figures

COLOR ORIGINAL READOUT APPARATUS

BACKGROUND OF THE INVENTION

1. Field of the Invention

The present invention relates to a color original readout apparatus which reads out the image of an original, as image data containing color data, with an image sensor such as a CCD or the like.

2. Description of the Prior Art

Image processing is known according to which the image of an original is read out as electric signals by an image sensor such as a CCD. According to the electric signals obtained, the image of the original is reproduced on a recording medium such as a paper sheet, is displayed on a display device such as a CRT or the like, or is transmitted to a remote place as in the case of a facsimile. Most of the image processing methods as described above process the image in monochrome. However, image processing of image data by readout of color data of a color original has been recently proposed.

In general color original readout apparatus, three image sensors (CCDs) are arranged with each having a filter of one of three colors red, green and blue to obtain signals for these three colors. On the basis of the signals obtained in this manner, an image is formed by a recording apparatus such as a laser beam printer, an ink jet printer or the like. In order to form the image with a laser beam printer, the part of the color image at which the black signal is obtained through the blue filter is reproduced with a yellow toner, the part of the color image which the black signal is obtained through the green filter is reproduced with a magenta toner, and the part of the color image at which the black signal is obtained through the red filter is reproduced with a cyan toner. In some apparatus, for the part of the image at which the black signal is obtained through all of these filters, printing with these toners is not performed and the part is reproduced in black by a black toner.

However, the color original readout apparatus of this type requires a plurality of image sensors. Since image sensor such as CCDs are expensive, this results in high manufacturing cost of the overall apparatus.

When a plurality of image sensors is used, a problem of mutual alignment of the sensors also occurs. If the positions of the image sensors deviate from one another, the image reproduced on the basis of the obtained image signals will have color drift. In order to prevent this, the readout positions of the image sensors must be carefully aligned. The size of the picture element widely adopted for a CCD as the image sensor is about 15μ. In order to solve problem as described above, the deviation from alignment of the image sensors must be corrected with a precision below several tenths the size of the picture element. This is almost impossible to accomplish.

In order to solve the problem of the mutual deviation of the image sensors and to lower the manufacturing cost of color original readout apparatus, it is proposed to obtain data corresponding to a plurality of colors with a single image sensor. It is proposed, for example, to rotate at high speed a plurality of filters of different colors in front of the image sensor to thereby color-separate the light which becomes incident on the image sensor. With this arrangement, the deviation in the direction of main scanning is eliminated. However, the readout positions on the original by subscanning differ slightly according to each filter. When an original is read out by separating the image in three colors, the image data for each color is obtained by each scanning operation. If the image data for the same color is read out upon displacement by one picture element in the direction of subscanning, the three image signals obtained upon color separation are obtained from positions which deviate from each other by ⅓ picture element. It is not desirable to reproduce the image from the three image signals which are read out from different positions of the original.

Another method is proposed by the same applicant. According to this method, the image of a original is color-separated into red and black using white and red light. The logic operations are performed according to which black is printed if the black signal is obtained with both lights, red is printed if the black signal is obtained with white light and the white signal is obtained with the red light, and white is printed in other cases. In this manner, the red and black data of the original is discriminated. However, with this method, during readout of a completely black original, the white signal is obtained with the red light and the black signal is obtained with the white light at the edge of the black image due to deviation in the subscanning direction. This results in an incorrect discrimination of red data. Thus, the edge of the black image is printed in red, providing poor reproduction.

SUMMARY OF THE INVENTION

The present invention has been made in consideration of the factors described above, and it is an object of the invention to provide a color original readout apparatus which is capable of reading out color data satisfactorily.

It is another object of the present invention to provide a color original readout apparatus which is simple in construction and which is capable of reading out color data without color drift.

It is still another object of the present invention to provide a color original readout apparatus which is capable of obtaining a plurality of color data required for color discrimination from the same scanning line during readout of color data by a one-dimensional image sensor.

The above and other objects of the present invention will become apparent from the following description.

DETAILED DESCRIPTION OF THE PREFERRED EMBODIMENTS

A color original apparatus according to an embodiment of the present invention will first be described, which is capable of preventing drift in the readout position in the main scanning direction and in the subscanning direction and which is capable of obtaining image data containing correct color data.

Figure 1:
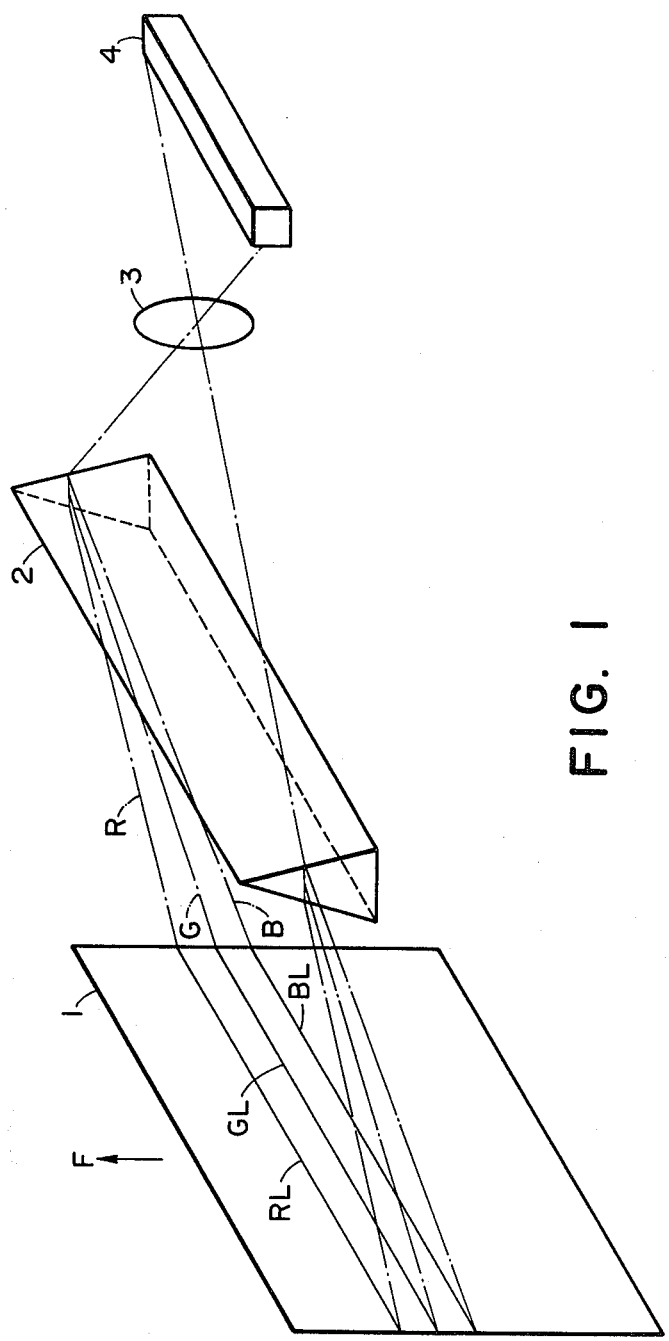
FIG. 1 is a schematic view showing the principle of a color readout apparatus according to an embodiment of the present invention.

FIG. 1 is a schematic view showing the principle of the color original readout apparatus according to this embodiment. The apparatus reads an original 1, and includes a prism 2, a lens 3, and a one-dimensional image sensor. A red light optical path R, a green light optical path G, and a blue light optical path B are all indicated by the alternate long and short dashed lines. The direction of relative movement between the original 1 and the one-dimensional image sensor 4, that is, the subscanning direction is indicated by symbol F.

This embodiment utilizes the difference in the refractive index according to the wavelength of light reflected by the original. The positions of the original to be main-scanned by a single image sensor are made different according to the light spectrum by using a spectroscope such as a prism. The image data corresponding to each light spectrum at the same position of the original is read out by subscanning. In this manner, the drift in the main scanning direction and in the subscanning direction of the color readout image is prevented, and image data containing correct color data is obtained.

When the prism 2 is disposed in the optical path from the original 1 to the image sensor 4 as shown in FIG. 1, the optical paths of the three colors slightly deviate from one another since the refractive indices of the reflected light from the original at the prism 2 upon irradiation of the original with lights of three colors, red, green and blue, differ. In FIG. 1, the magnitude of deviation is shown as emphasized for the sake of easy understanding. The scanning lines of the original with three colors are indicated by RL for red light, GL for green light, and BL for blue light. The magnitude of this deviation can be controlled by the form of the prism 2, the distance between the original 1 and the prism 2, and so on. The magnitude of this deviation is set to be ⅓ the desired scanning interval of the original. If the readout operations for red, green and blue lights are sequentially performed each time subscanning is performed for ⅓ of the scanning interval of the original, the image data of three colors at the same position of the original can be read out.

Figure 2:
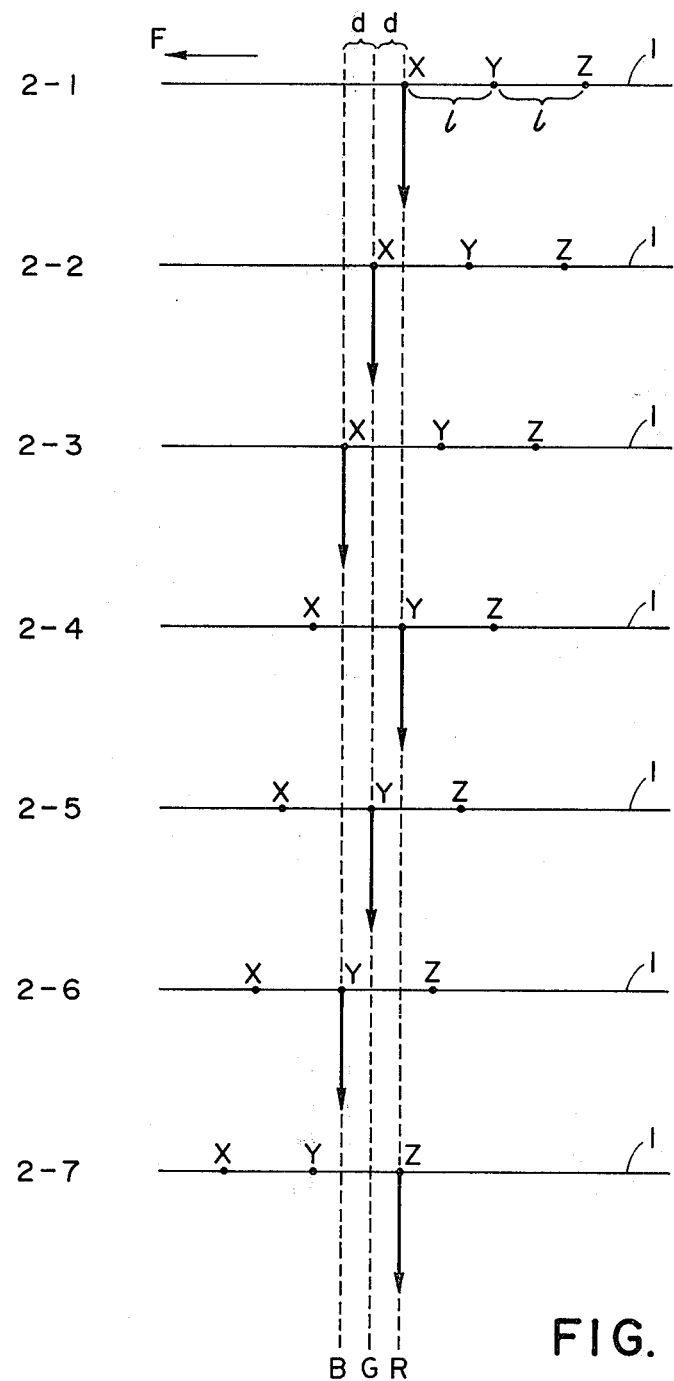
FIG. 2 is a view for explaining the readout operation of color data according to the apparatus of the present invention.

This will be described in further detail with reference to FIG. 2. Scanning positions X, Y and Z are spaced apart at intervals l on the original 1. The optical paths R, G and B incident on the prism 2 shown in FIG. 1 are indicated by three dotted lines, that is and have an interval d corresponding to ⅓ of the scanning interval l, 1/3. The optical paths and the original move relative to each other, that is, perform subscanning. If the optical paths are regarded as stationary, the original 1 is assumed to be moving in the subscanning direction F. FIG. 2 shows the conditions at different times 2-1 to 2-7.

When the scanning position X reaches the red light optical path R at time 2-1, the image data corresponding to red light is obtained. When subscanning for an interval d is performed, the scanning position X reaches the green light optical path G at time 2-2 and the image data corresponding to green light is red out. After another subscanning operation for the interval d, the scanning position X reaches the blue light optical path B at time 2-3, and the image data corresponding to blue light is read out. By these three readout operations, the three image data corresponding to three colors at the same scanning position X of the original are obtained.

When another subscanning operation for the interval d is performed, the scanning position Y reaches the red light optical path R at time 2-4 and the image data corresponding to red light is read out. In a similar manner, each time the subscanning operation for the interval d is performed, the image data corresponding to green and blue lights at the scanning position Y is read out. The same readout operation corresponding to three colors is performed for the scanning position Z.

In order to sequentially read out the original for three colors, there are various known methods. These methods include a method according to which filters of three colors are disposed in the optical path and are rotated at high speed, or a method according to which a light source for sequentially emitting lights of three different colors is utilized. In either method, the image data of the original corresponding to each color is obtained by driving these color filters or light sources in accordance with the timing of subscanning and main scanning.

Figure 3:
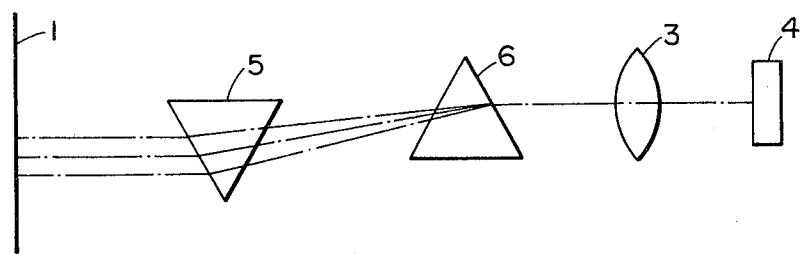
FIGS. 3 and 4 are schematic views showing color original readout apparatus according to other embodiments of the present invention.
Figure 4:
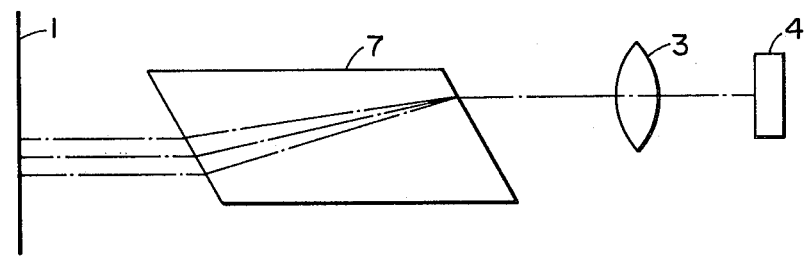

FIGS. 3 and 4 are schematic views of the readout apparatus incorporating prisms of different shapes. In FIGS. 3 and 4, the same reference numerals denote the same parts as in FIG. 1. Spectroscope members 5, 6 and 7 comprise prisms or the like. FIG. 3 shows a case wherein two prisms are used, and FIG. 4 shows a case wherein the planes of incidence and exit are parallel to each other and are inclined with respect to the optical path. Referring to FIGS. 1, 3 and 4, we see that theoretically, the same effects are obtainable if the prisms are arranged in front or behind the lens. It is also possible to incorporate a deflecting member such as a mirror to deflect the optical path in a suitable manner.

Figure 5:
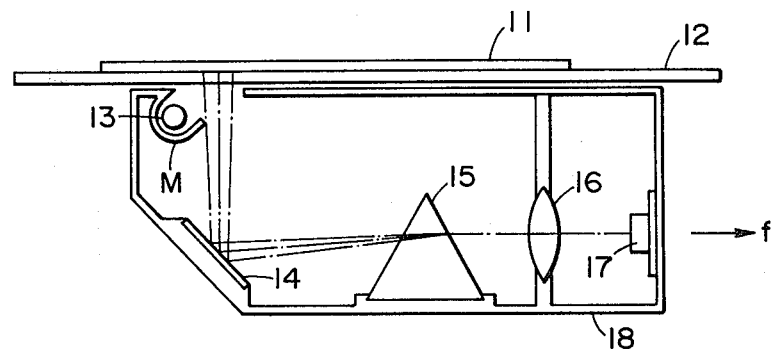
FIG. 5 is a sectional view showing the construction of a readout unit according to the present invention.

FIG. 5 shows the construction of a readout unit of the color original readout apparatus of the present invention. The readout unit reads an original 11 and includes an original table 12 of transparent glass; a light source 13 for radiating the original, which consists of a discharge lamp a emitting red light, a discharge lamp b emitting green light, a discharge lamp c emitting blue light, and a reflecting mirror M; a mirror 14 for deflecting the optical path of the light reflected by the original 11; a prism 15; a lens 16; and a one-dimensional CCD image sensor 17 (to be referred to as a CCD for brevity hereinafter).

As described above, the light source 13 includes a plurality of discharge lamps for radiating the original surface with light of three different colors. More specifically, the light source 13 includes an alternately arranged array of xenon lamps, five for each color. The xenon lamps which emit white color are covered with filters of respective colors of red, green and blue. The original table 12 is securely fixed to the apparatus main body (not shown). The light source 13, the mirror 14, the prism 15, the lens 16, and the CCD 17 together define an optical system 18. The optical system 18 is moved at a constant velocity v by a known drive means in the direction f. Upon the movement of this optical system 18, the original 1 is subscanned, and the CCD 17 reads the image on the entire surface of the original. The velocity v of the optical system 18 is determined by the time required for one scanning operation of the CCD 17, that is, the readout capacity of the CCD 17.

Figure 6:
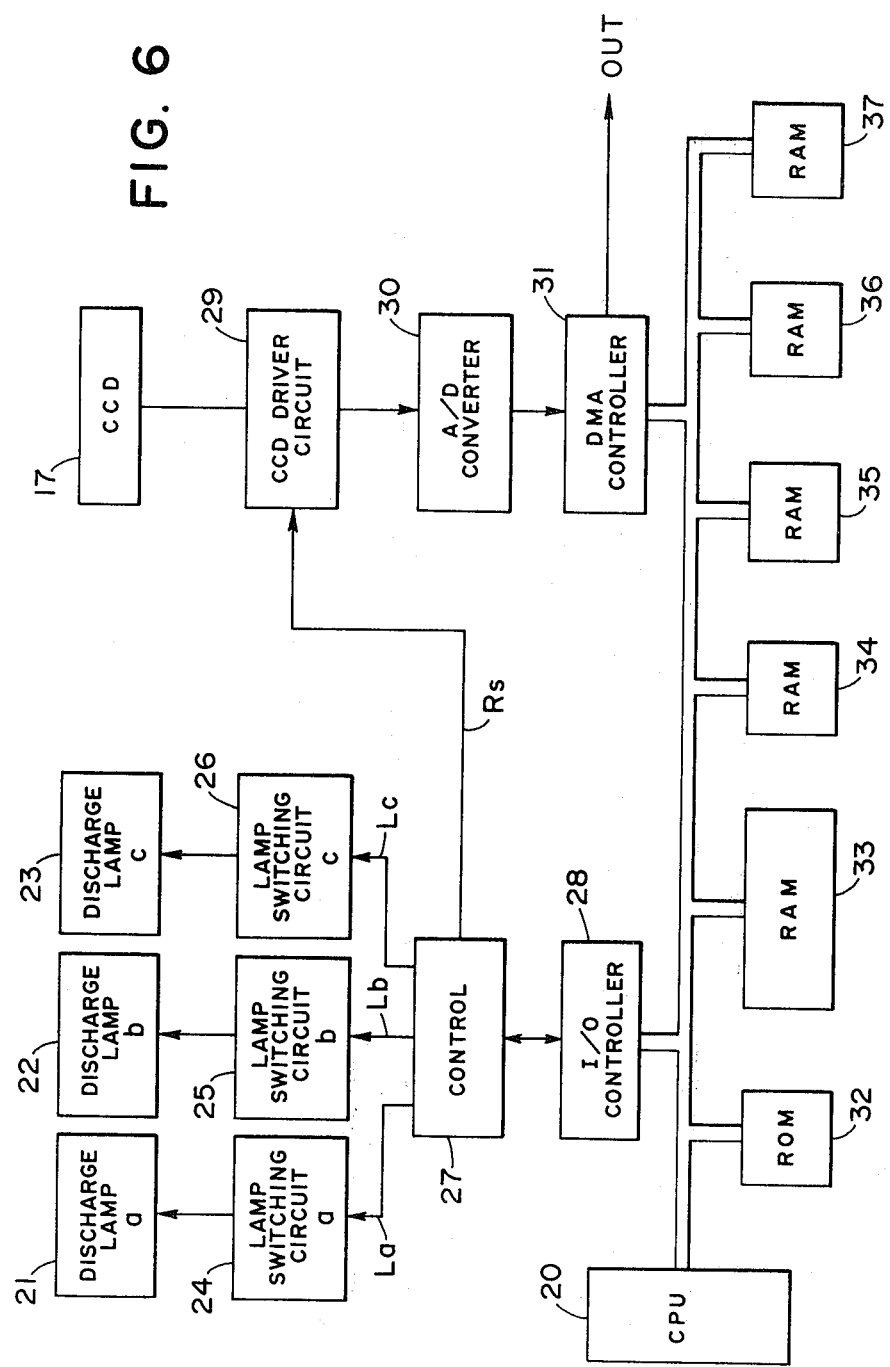
FIG. 6 is a block diagram of the circuitry for controlling the readout unit shown in FIG. 5.

FIG. 6 is a block diagram of the circuitry for controlling the readout operation of the readout unit shown in FIG. 5. The discharge lamp 1 (21) emits red light, the discharge lamp b (22) emits green light, and the discharge lamp c (23) emits blue light. Lamp switching circuits a (24), b (25) and c (26) are for actuating the discharge lamps a (21), b (22) and c (23), respectively. A CCD driver circuit 29 drives the CCD 17. A control 27 controls the operation of the lamp switching circuits a (24), b (25) and c (26), and controls the operation of the CCD driver circuit 29. An I/O controller 28 is connected to the control 27. A central processing unit 20 (to be referred to as a CPU for brevity hereinafter) controls the operations of the respective parts and processes the readout image data. An analog-to-digital converter 30 (to be referred to as an A/D converter for brevity hereinafter) converts the image data, an analog signal output from the CCD 17, into a digital signal. A DMA controller 31 controls the DMA transfer of the image data. A ROM 32 stores control programs, and RAMs 33, 34, 35, 36 and 37 store readout image data.

Figure 7:
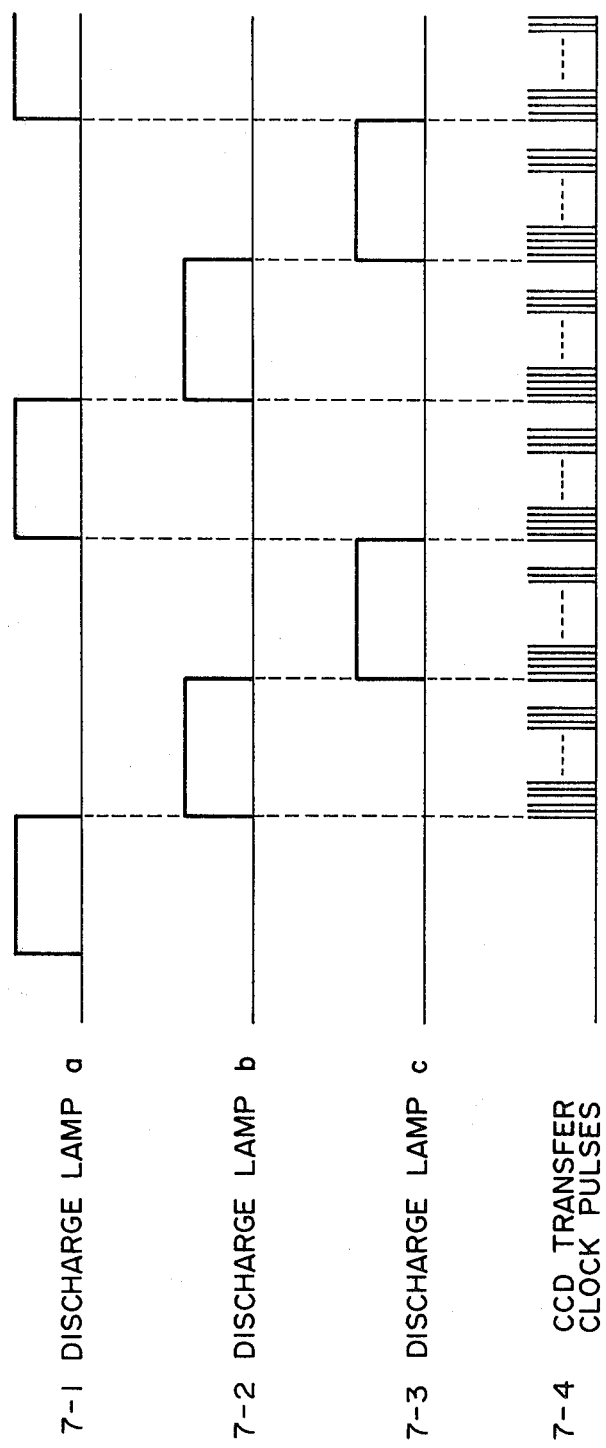
FIG. 7 shows timing charts of the timing signals for operation of the circuitry shown in FIG. 6.

FIG. 7 shows timing charts of the timing of lighting of the light source by control signals supplied by the control 27 and also the timing of readout of the CCD.

The mode of operation of the color original readout apparatus of the present invention will now be described. When an original readout instruction is supplied from a control unit (not shown), the optical system 18 starts moving at the velocity v in the direction f as described above and starts the subscanning operation. When the original readout instruction is supplied to the CPU 20, the CPU 20 supplies a control signal to the control 27 through the I/O controller 28. When the control 27 receives the control signal from the CPU 20, the control 27 produces a readout start signal RS to the CCD driver circuit 29. Simultaneously, the control 27 outputs drive signals La, Lb and Lc to sequentially drive the lamp switching circuits a (24), b (25) and c (26). In response to switching control signals La, Lb and Lc from the respective lamp switching circuits a (24), b (25) and c (26), the discharge lamps a (21), b (22) and c (23) start lighting as shown in 7-1, 7-2 and 7-3 of FIG. 7. The timing of lighting of these discharge lamps is synchronous with the movement of the optical system 18 over the interval d (⅓ the scanning interval l) shown in FIG. 2. In order to read out from the CCD 17 the image signal during the lighting period of the discharge lamp of each color, the CCD driver circuit 29 generates a predetermined number of transfer clock pulses as shown in 7-4 of FIG. 7, which are synchronous with the timing of lighting and extinguishing of the discharge lamps. In response to these transfer clock pulses, the CCD 17 outputs the image data. In this manner, the discharge lamps a (21), b (22) and c (23) light and go out, and the light emitted from these discharge lamps and reflected by the original is read by the CCD 17 to provide the image data corresponding to the light of each color. Thus, the image data corresponding to the light of each color can be read out from the same position of the original, as has been described above with reference to FIG. 2. The readout image data is converted by the A/D converter 30 into an 8-bit digital signal containing 8 gradation data. This digital signal is stored in the RAM 33 at high speed by the DMA controller 31. The gradation data is maximum at the dark portion of the original and is at minimum at the bright portion of the original. The RAM 33 sequentially stores the signals corresponding to light of three colors for each scanning line. When the subscanning with the optical system 18 over the entire surface of the original is completed, the readout operation of the original is completed.

According to the control program stored in the ROM 32, The CPU 20 processes the image data stored in the RAM 33. The CPU 20 compares the number of gradations of the image signal for the same picture element (picture element on the same subscanning line) corresponding to light of three colors and stored in the RAM 33. The CPU 20 selects the image signal with the least number of gradations and stores this image signal in the RAM 34. In this manner, the black component of the original image is extracted. Next, the minimum number of gradations of the image signal stored in the RAM 34 which is selected previously is subtracted from the number of gradations of the image signals corresponding to lights of the three colors, that is, red, green and blue. The three signals obtained by these subtractions are stored in the RAMs 35, 36 and 37, respectively. The signals stored in the RAMs 35, 36 and 37 are image signals which are to form the image to be reproduced. In the printing process with a laser beam printer, for example, the signal stored in the RAM 34 is reproduced with a black toner. The signal stored in the RAM 35 is the signal obtained in correspondence with the red light and is reproduced with a cyan toner, the signal stored in the RAM 36 is a signal obtained in correspondence with the green light and is reproduced with a magenta toner, and the signal stored in the RAM 37 is a signal obtained in correspondence with the blue light and is reproduced with a yellow toner.

In a conventional color copying machine which reproduces a color image with color toners, grays and black are printed by applying all three toners of yellow, magenta and cyan. However, due to some changes in the tone, reproducing characteristics and so on of these toners, satisfactory color balance cannot be obtained for the gray or black part of an image. The part to be reproduced in gray or black may thus be printed with a tone. Furthermore, at the edge of such a gray or black portion, slight color drift results in color blurring. However, if the gray or black portion of the original is reproduced with a black toner alone as in the case of the embodiment of the present invention, the problem with the color drift during reproduction is eliminated. Other colors close to gray can be correctly printed by mixing some color with the black toner. According to this embodiment of the present invention, the black portion of the original is singled out by an operation which reads out the image data without involving color drift.

In summary, according to the embodiment of the present invention described above, since the image data corresponding to a plurality of colors for the same position of the original can be obtained by a single one-dimensional image sensor, color separation of the color original can be performed correctly. Therefore, the image reproduced, on the basis of the signals thus obtained, is free from color drift and is satisfactory in color balance.

By using, as the light source, a filter of a plurality of colors in front of a single light source to thereby sequentially change the color of the filter, light of a plurality of colors can be obtained. A light source, other than the discharge lamp, which emits light of a single wavelength in a stable manner may be used according to the present invention.

The color original readout apparatus according to the second embodiment of the present invention will now be described. This embodiment is capable of eliminating the deviation of the readout position in the main scanning direction and the subscanning direction and is capable of obtaining the image data containing the correct color data.

The second embodiment corrects the deviation in the readout position which may be caused during subscanning by using, among the image signals corresponding to a plurality of different light spectra obtained upon a single scanning operation of the one-dimensional CCD image sensor, a mean value of the image signals of main scanning lines adjacent to each other and corresponding to light of the same spectrum.

The principle of the second embodiment of the present invention will now be described in more detail. For the sake of simplicity, it is assumed that the CCD (one-dimensional image sensor) alternately reads by each scanning operation light of two spectra: red light and light other than red. The readout signals obtained are subjected to logic operation. The position with the black signal for both light spectra is discriminated to be black. The position with the black signal for light other than red and the white signal for red light is discriminated to be red. The position with the white signal for both light spectra is discriminated to be white. In this manner, the original image is color-separated into a red signal, a black signal and a white signal.

Figure 8:
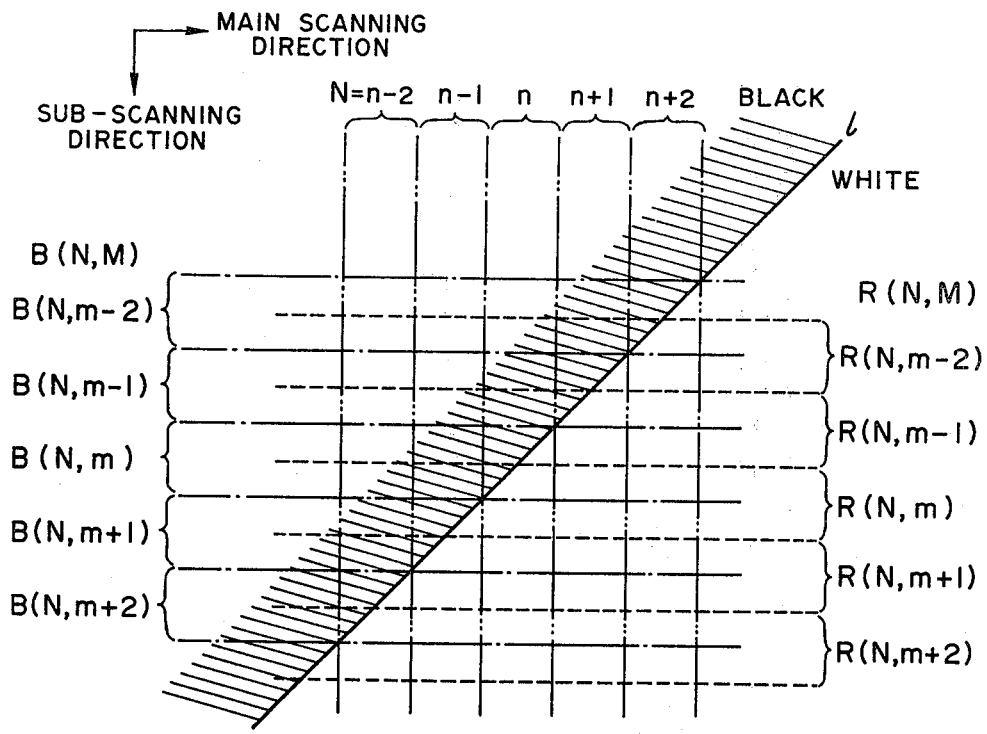
FIG. 8 is a view for explaining the principle of the present invention.

FIG. 8 shows the position of the picture element on a part of an original including white and black portions only, which is read out by scanning lines R (areas indicated between dotted lines) corresponding to the red light and scanning lines B (areas indicated between alternate long and short lines) corresponding to light other than red. As has been described above, the readout of the image corresponding to each different light spectrum is performed by the CCD for each main scanning line. After the scanning operation with the scanning line B (N, m−2) corresponding to light other than red, the scanning operation with the scanning line R (N, m−2) corresponding to the red light is performed. In a similar manner, scanning operations of the image are performed alternately for different light spectra in the order of B (N, m−1), R (N, m−1), B (N, m), R (N, m), B (N, m+1), R (N, m+1), B (N, m+2), and R (N, m+2) (where N is the ordinal number representing the positions of the picture elements (areas indicated by the alternate long and two short dashed lines) in the main scanning direction, the leftmost picture element in FIG. 8 being assigned n−2; and M is the ordinal number representing the main scanning position in the subscanning direction, M being indicated by a small letter m to advance from the top to the bottom in FIG. 1. Line l in FIG. 8 represents the boundary between the white and black portions; the area above the line l is black and the area below the line l is white in FIG. 1.

The logic level of the signal obtained by readout of the original by the CCD is such that the white signal is at logic level "1" and the black signal is at logic level "0". In practice, the black signal is not precisely at "0" level due to optical flare, dark current of the CCD or the like, but it can be theoretically assumed to be at logic level "0".

Referring to FIG. 8, if all the squares surrounded by the dotted lines or the alternate long and short dashed lines indicating the main scanning positions and the alternate long and two short dashed lines representing the subscanning positions are black, the signal is at level "0". If all the squares are white, the signal is at level "1". The intermediate levels of the signal are indicated by the ratios of the white squares to the black squares.

Referring to FIG. 8, the readout signals of the scanning line B (N, m) corresponding to light other than red are at levels 0, 0, 0.5, 1, and 1 for the respective picture elements corresponding to B (n−2, m), B (n−1, m), B (n, m), B (n+1, m), and M (n+2, m). The readout signals of the scanning line R (N, m) next to the scanning line B (N, m) are at levels 0, 0.125, 0.875, 1, and 1 for the respective picture elements corresponding to R (n−2, m), R (n−1, m), R (n, m), R (n+1, m) and R (n+2, m). If the portion with the readout signal at a level less than 0.6 is discriminated to be black, the boundary between the white and black portions of the original is discriminated to be black for B (n, m) since the level of the corresponding readout signal is 0.5 and is discriminated to be white for R (n, m) since the level of the corresponding readout signal is 0.875. If the color discrimination is performed in accordance with the logic operation of the image signals corresponding to B (n, m) and R (n, m) as described above, the black signal is obtained with light other than red and the white signal is obtained with red light. Therefore, this position is readout as a red portion and is printed in red during reproduction.

According to the present invention, in place of the main scanning line R (N, M) corresponding to red light, a mean value R' (N, M) of the two scanning lines before and after the scanning line B (N, M) corresponding to light other than red is used for the logic operation. Specifically, for the scanning line B (n, m) corresponding to light other than red, a mean value R' (n, m) of the scanning lines R (n, m−1) and R (n, m) corresponding to red light is calculated. The R' (n, m) and B (n, m) are subjected to the logic operation to obtain the color data. In this manner, the levels of the readout signals obtained with the scanning line R (n, m) are 0 for R (n−2, m), 0.125 for R (n−1, m), 0.875 for R (n, m), 1 for R (n+1, m) and 1 for R (n+2, m). The levels of the readout signals obtained with the scanning line R (N, m−1) are 0 for R (n−2, m−1), 0 for R (n−1, m−1), 0.125 for R (n, m−1), 0.875 for R (n+1, m−1) and 1 for R (n+2, m−1). Then, the mean values of the levels of the readout signals for the picture element (ordinal number N) of the main scanning are 0 for R' (n−2, m), 0.0625 for R' (n−1, m), 0.5 for R' (n, m), 0.975 for R' (n+1, m) and 1 for R' (n+2, m). These values are very close to levels 0, 0, 0.5, 1 and 1 corresponding to the scanning line B (N, m). If the R' (N, m) and B (N, m) are subjected to the logic operation, the level is 0.5 at B (n, m) and is 0.5 at R' (n, m), which are both below 0.6. Therefore, this position is discriminated to be black, and the incorrect color discrimination of the boundary between the black and white portions of the original as red is eliminated.

The scanning lines R (N, M) corresponding to red light are located at ½ the interval between the scanning lines B (N, M) corresponding to light other than red. Therefore, if the mean value R' (N, M) of the signals corresponding to the two scanning lines before and after the scanning line B (N, M) is calculated, this mean value R' (N, M) may be regarded as corresponding to the scanning line B (N, M). In this manner, two signals corresponding to two different light spectra read out from substantially the same position of the original can be obtained.

As has been mentioned previously, methods other than that described above can be adopted. For example, the method of using the mean value of the image signals corresponding to one light spectrum only or the method of subjecting to the logic operation the signals corresponding to red light and to light other than red may be used. Describing an example of such a method with reference to FIG. 8, the levels of the readout signals obtained with the scanning lines R (N, m−1) and R (N, m) are added in the ratio of 1:3 to obtain a geometric mean R' (N, m) thereof. The levels of the readout signals obtained with the scanning lines B (N, m) and B' (N, m+1) are added in the ratio of 3:1 to obtain a geometric mean B' (N, m) thereof. These geometric means are then subjected to the logic operation to thereby provide the color data.

According to another example of an alternative method, mean values of signals for the scanning lines R (N, M) corresponding to red and B (N, M) corresponding to light other than red are obtained. The mean value R' (M, N) for red light and the actual signal B (M, N) for light other than red are subjected to the logic operation to provide an image signal. The mean value B' (M, N) corresponding to light other than red and the actual readout signal R (M, N) for red light are subjected to the logic operation to provide an image signal. These image signals are used to form the image. In this method, the image signal with the scanning lines at a density twice that of the two methods as described above is obtained.

In any of the methods as described above, the mean value of the image signals of the adjacent scanning lines is obtained for the same light spectrum. The image signal corresponding to the area between these scanning lines is thus obtained. In this manner, the image signal corresponding to different spectra for the same position of the original is obtained. In place of the method for obtaining the geometric mean, the method for obtaining the harmonic mean can also be used. According to this method, an image signal may be formed without deteriorating the dark components of the signal. However, the operation circuit becomes complex in configuration.

Figure 9:
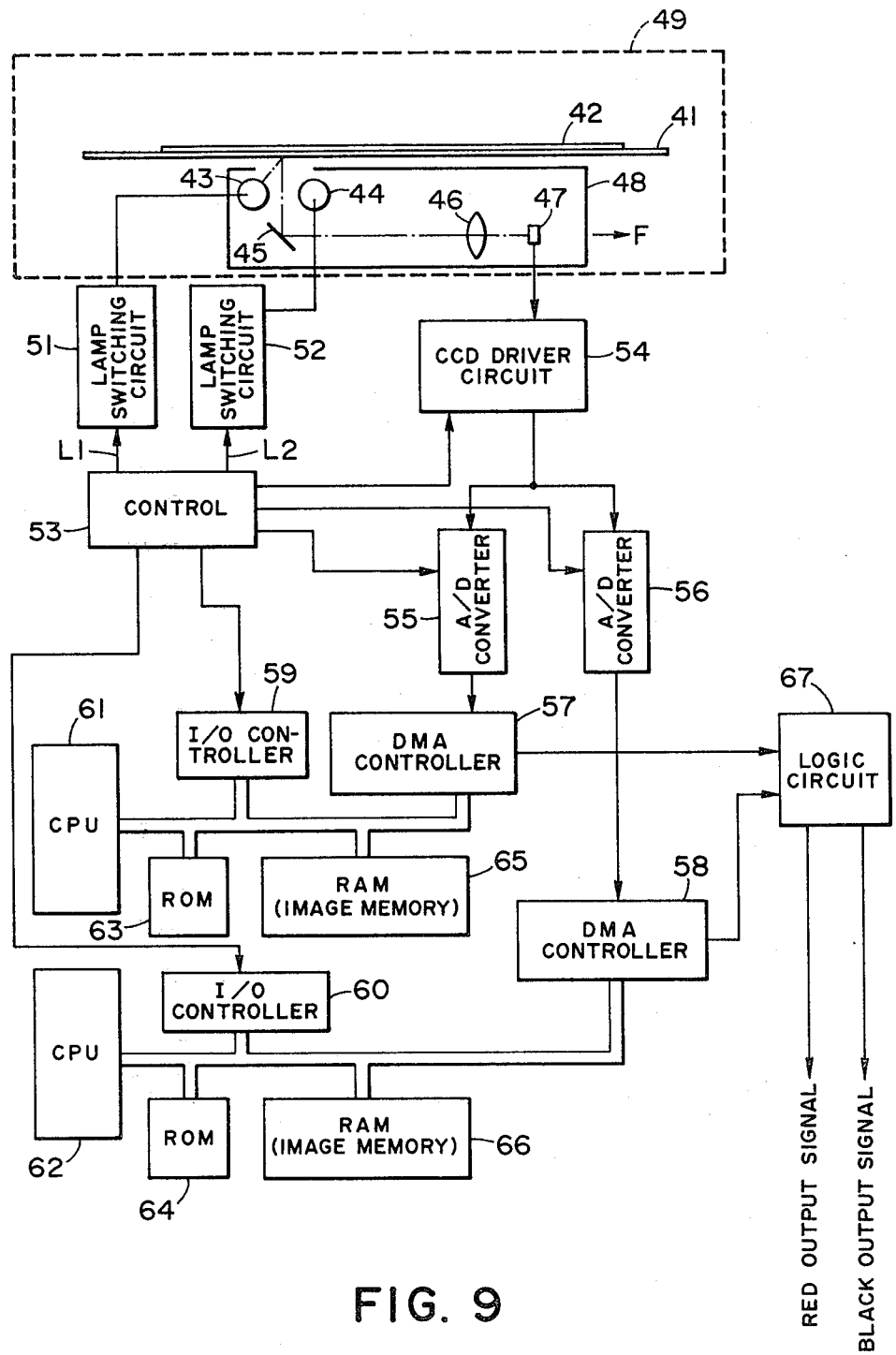
FIG. 9 is a block diagram of the circuitry including the readout unit and a control circuit therefor according to the present invention.

FIG. 9 shows the configuration of a readout unit 49 and a control circuit therefor according to another embodiment of the present invention. An original 42 is placed on an original table 41 of transparent glass. A red light source 43 which emits red light, a blue light source 44 which emits blue light, a mirror 45, a lens 46, and a CCD 47 define an optical system 48. The readout of the original is performed by main scanning the original 42 placed on the original table 41 fixed on the apparatus main body (not shown) with the CCD 47 while subscanning by moving the optical system 48 in the downward direction indicated by the arrow. The light sources 43 and 44 alternately light up and go out so as to alternately illuminate the original 42 with red and blue light. In synchronism with the operation of these light sources, the CCD 47 is driven to read out the image data corresponding to each color. Then, the image signals corresponding to different colors are obtained upon each scanning operation.

Lamp switching circuits 51 and 52 control the timing of lighting the light sources 43 and 44, respectively. A CCD driver circuit 54 drives the CCD 47. A control 53 outputs timing signals L1 and L2 to the lamp switching circuits 51 and 52 to turn on and off the light sources 43 and 44 at predetermined times. When the lamp switching circuits 51 and 52 receive the timing signals L1 and L2, they light up the light sources 43 and 44. In response to a transfer clock pulse from the CCD driver circuit 54, the CCD 47 reads out the image signal corresponding to light of each color. The CCD 47 transfers the image signal to an A/D converter 55 or 56 which converts the image signal (analog signal) into a 4-bit digital signal containing gradation data. This A/D converter 55 or 56 outputs the digital signal to a DMA controller 57 or 58. The A/D converters are incorporated in correspondence with each color since a different image signal may be generated due to the difference in the wavelength or brightness of the light. If such a difference is not involved, only one A/D converter is needed. The control 53 outputs a control signal for conversion operation of the A/D converter to the A/D converter 55 or 56. The digital signal obtained by the A/D converter is stored in a RAM 65 or 66 through the DMA controller 57 or 58. Since the A/D converter 55 converts a image signal corresponding to red light into the digital signal and the A/D converter 56 converts the image signal corresponding to blue light into a digital signal, the image signals corresponding to red light are stored in the RAM 65 and the image signals corresponding to blue light are stored in the RAM 66 for each scanning line. When the optical system 48 completes the readout of the entire surface of the original and the image data corresponding to one page of the original is completely stored in RAMs 65 and 66, CPUs 61 and 62 obtain the mean values of the signals according to the program stored in a ROM 63 or 64. Since each CPU is incorporated separately for each series of image signals, the processing time does not become too long even if both series of image signals must be processed. The image signals thus processed are supplied to a logic circuit 67 through the DMA controller 57 or 58. The timings of the operations of the CPUs and the DMA controllers are controlled by the control 53 through the I/O controllers 59 and 60. Under the control of the CPUs, the logic circuit 67 subjects the image signal corresponding to red light and the image signal corresponding to blue light to logic operation, color-separates these signals, and forms two kinds of image signals, a red signal and a black signal which are supplied to a printer.

If the printer need not produce halftones, the data to be operated at the logic circuit 67 need only be a binary value (1 bit). In this case, the most significant bit of the image signal (several bits) operated at the CPU can be used.

Figure 10:
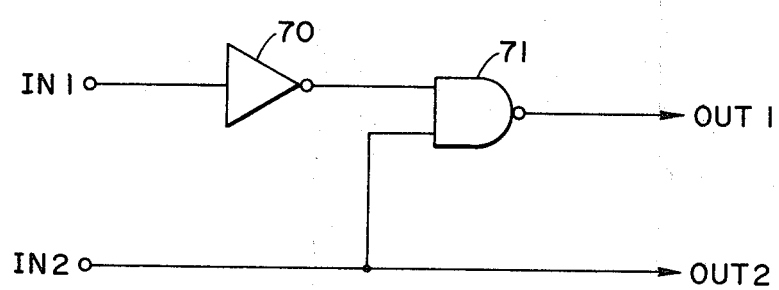
FIG. 10 is a circuit diagram showing an example of the logic circuit.

FIG. 10 shows an example of the logic circuit 67, including a NOR circuit 70 and a NAND circuit 71. The image signal corresponding to blue light is input at an input IN1 from the DMA controller 58 shown in FIG. 9. The image signal corresponding to red light is input as an input IN2 from the DMA controller 57. As has been described above, the black signal is at logic level "0" and the white signal is at logic level "1" among the signals input to the logic circuit 67. The binary signals are subjected to the logic operation by the circuit shown in FIG. 10 to provide outputs OUT1 and OUT2. The OUT1 is the red signal and the OUT2 is the black signal. When the output is at logic level "0", the image is printed in a color corresponding to the color of the signal by a printer such as a laser beam printer.

According to this embodiment of the present invention, among the image signals corresponding to a plurality of different light spectra obtained by each scanning operation by the one-dimensional image sensor, the mean value of the image signals of the adjacent main scanning lines for the same light spectrum is obtained. The obtained mean value is used as the image signal corresponding to the region between the actual two scanning lines, so that a plurality of image signals corresponding to different light spectra can be read out from virtually the same position of the original. Accordingly, deviation of the readout positions corresponding to light spectra by subscanning can be corrected. Although two light sources for emitting red and blue lights are used to perform the color separation of black, red and white, light sources for emitting light of other colors can be used to obtain the image signals corresponding to these colors for color discrimination.

Furthermore, in the embodiment described above, a plurality of light sources for emitting light of different colors are used. However, it is also possible to incorporate a plurality of filters for one light source to obtain light of a plurality of colors. Alternatively, it is possible to incorporate the filters in the optical path leading to the CCD.

Color separation into more colors can be performed using three light sources of different colors. In this case, image signals of adjacent scanning signals for light of the same spectrum are added in the ratio of 2:1 to obtain a mean value. In this manner, the image signal at a position ⅓ of the width of the picture element from the actual scanning line is used. By using this image signal, the image signals at the same position of the original can be obtained for light of three different colors.

In the embodiment, the image signal read out by the circuitry shown in FIG. 9 is stored in the memory in units of pages. However, it is also possible to use a buffer memory corresponding to the image data of one scanning line. After readout by the CCD, the image data can then be immediately subjected to the logic operation.

In the embodiments described above, a type of apparatus in which the optical system is moved is used. However, it is also possible to use a readout apparatus in which the original is moved, or a readout apparatus in which a mirror in the optical system is moved, or other readout apparatus of known type.

The present invention has been described with reference to the case wherein one image sensor is used. However, it is also possible to incorporate a plurality of image sensors in the main scanning direction and to read out the image of the original by separating it with the respective image sensors. The advantageous effects of the present invention can also be attained in this case.

What I claim is:

1. A color original readout apparatus comprising:
    radiating means for radiating an original with light of different spectra;
    an image sensor for reading out an image of the original produced by light reflected theretoward from the original;
    means for causing relative movement between the original and said image sensor while the image is being read out; and
    spectroscope means for making optical paths of the light reflected from the original toward said image sensor different according to the spectra of the reflected light so that light of different spectra reflected from any one position on the original during said relative movement with respect to said image sensor is incident on said image sensor.

2. An apparatus according to claim 1, wherein readout positions of the original corresponding to said image sensor are rendered different by said spectroscope means according to the spectra of light.

3. An apparatus according to claim 2, wherein said image sensor comprises a one-dimensional image sensor, and wherein said movement causing means moves said image sensor relative to the original in a direction substantially perpendicular to a scanning direction of said image sensor to read out the image.

4. An apparatus according to claim 3, further comprising controlling means for driving said image sensor and said radiating means in synchronism with the movement of said image sensor relative to the original caused by said movement causing means.

5. An apparatus according to claim 4, wherein said radiating means radiates red, green and blue colors of light.

6. An apparatus according to claim 1, wherein said radiating means, said image sensor and said spectroscope means are formed as a unit.

7. An apparatus according to claim 1, wherein said image sensor sequentially reads the same position on said original in synchronism with light radiation of different spectra of the original.

8. A color original readout apparatus comprising:
    an image sensor for main scanning and thereby reading out an image of an original, and for generating image signals representative of said reading out;
    means for causing relative movement between the original and said image sensor while the image is being read out;
    radiating means for sequentially radiating the original with light of different spectra in synchronism with main scanning of the original by said image sensor; and
    operating means for operating on said image signals generated by said image sensor so that a readout position of said image sensor corresponding to light of a first spectrum may correspond to an adjacent readout position of said image sensor corresponding to light of a second spectrum.

9. An apparatus according to claim 8, wherein said operating means obtains a mean of image signals representative of adjacent lines main scanned by said image sensor for at least one of the light of different spectra.

10. An apparatus according to claim 9, wherein color discrimination of the original is performed by means of image signals corresponding to the light of the first spectrum and image signals corresponding to light of the second spectrum.

11. An apparatus according to claim 8, further comprising a plurality of memories for storing image signals read out for the light of a plurality of spectra.

* * * * *

UNITED STATES PATENT AND TRADEMARK OFFICE
CERTIFICATE OF CORRECTION

PATENT NO. : 4,415,925

DATED : November 15, 1983

INVENTOR(S) : YASUYUKI TAMURA

It is certified that error appears in the above-identified patent and that said Letters Patent is hereby corrected as shown below:

IN THE ABSTRACT:

Line 5, between "original," and "a", insert --and--.

Column 1

Line 19, between "above" and "process", insert --,--,

Line 33, between "image" and "which", insert --at--,

Line 53, between "solve" and "problem", insert --the--.

Column 2

Line 12, change "a" to --an--.

Column 3

Line 6, between "original" and "apparatus", insert --read-out--,

Line 56, change "intervals 1" to --intervals $\ell$--,

Line 59, change "1, 1/3" to --$\ell$, that is $\ell/3$--.

UNITED STATES PATENT AND TRADEMARK OFFICE
CERTIFICATE OF CORRECTION

PATENT NO. : 4,415,925
DATED : November 15, 1983
INVENTOR(S) : YASUYUKI TAMURA

It is certified that error appears in the above-identified patent and that said Letters Patent is hereby corrected as shown below:

Column 5

Line 5, change "1(21)" to --$\underline{a}$ (21)--,

Line 37, change "RS" to --Rs--,

Line 47, change "interval 1" to --interval $\ell$--,

Line 68, delete "at", first occurrence.

Column 6

Line 8, change "The" to --the--,

Line 21, change "lights" to --light--.

Column 7

Line 56, change "Line 1" to --Line $\ell$--,

Line 58, change "line 1" to --line $\ell$--,

Line 59, change "line 1" to --line $\ell$--.

UNITED STATES PATENT AND TRADEMARK OFFICE
CERTIFICATE OF CORRECTION

PATENT NO. : 4,415,925

DATED : November 15, 1983

INVENTOR(S) : YASUYUKI TAMURA

It is certified that error appears in the above-identified patent and that said Letters Patent is hereby corrected as shown below:

Column 10

Line 21, change "a" to --the--, and change "the" to --a--.

Column 12, line 64
Claim 11, line 3

Change "light" to --lights--.

Signed and Sealed this

Nineteenth Day of February 1985

[SEAL]

Attest:

DONALD J. QUIGG

Attesting Officer     Acting Commissioner of Patents and Trademarks